United States Patent [19]

Tsuchimoto et al.

[11] Patent Number: 5,180,412
[45] Date of Patent: Jan. 19, 1993

[54] APPARATUS FOR FORMING A GLASS PRODUCT AND A METHOD FOR FORMING A GLASS PRODUCT

[75] Inventors: Yoshihiro Tsuchimoto, Musashino; Toshikazu Ikezawa, Sakura; Naoki Morihiro; Naoya Shimizu, both of Funabashi, all of Japan

[73] Assignee: Asahi Glass Company Ltd., Tokyo, Japan

[21] Appl. No.: 737,650

[22] Filed: Jul. 30, 1991

[51] Int. Cl.⁵ .................. C03B 11/00; C03B 11/14
[52] U.S. Cl. ........................................ 65/66; 65/68;
65/139; 65/140; 65/154; 65/155; 65/308
[58] Field of Search ............ 65/140, 68, 139, 42,
65/49, 47, 156, 260, 304, 154, 155, 59.23, 66,
308

[56] References Cited

U.S. PATENT DOCUMENTS

| | | | |
|---|---|---|---|
| 3,021,643 | 2/1962 | Blanding | 65/154 |
| 3,419,375 | 12/1968 | Meiresonne | 65/260 |
| 3,497,339 | 2/1970 | Eastus | 65/139 |
| 3,695,860 | 10/1972 | Katuta | 65/155 |
| 4,057,409 | 11/1977 | Kudryavtsev | 65/102 |
| 4,357,158 | 11/1982 | Garza | 65/304 |
| 4,704,152 | 11/1987 | Davey | 65/68 |

Primary Examiner—Joye L. Woodard
Attorney, Agent, or Firm—Oblon, Spivak, McClelland, Maier & Neustadt

[57] ABSTRACT

An apparatus for forming a glass product which comprises: a single glass gob feeding device for feeding a glass gob to a mold for forming a formed body; a press forming device for press forming the glass gob into the formed body of a predetermined shape; a formed body removing device; a plurality of carrier means on which the mold is loaded; and a transfer means for transferring and circulating the carrier means on which the mold is loaded in an order of the glass gob feeding device, the press forming device, the formed body removing device, and back to the glass gob feeding device; wherein, assuming a path is defined as a path for transferring and circulating the carrier means by the transfer means. a single path or a plurality of paths is or are provided for the single glass gob feeding device.

23 Claims, 8 Drawing Sheets

APPARATUS FOR FORMING A GLASS PRODUCT AND A METHOD FOR FORMING A GLASS PRODUCT

BACKGROUND OF THE INVENTION

1. Field of the Invention

This invention relates to an apparatus for forming a glass product and a method for forming a glass product such as a panel for a cathode ray tube (CRT).

2. Discussion of Background

Conventionally, as a press forming device of a glass product such as a panel or a funnel for a CRT, as shown in FIG. 3, a device is known in which a plurality of bottom molds are arranged on a disk-like index table 13, in its circumferential direction, and the index table to which the bottom molds are fixed, indexes (rotates by every predetermined angle) around the center axis thereof, successively in the order of the positions of generally the glass gob feeding device 11, the press forming device 10, the cooling device 1, the shell mold removing device 2, the cooling device 3, the formed body removing device 6, and the shell mold attaching device 8.

The conventional press forming device has following problems, in view of promoting the quality of the formed body such as dimensional accuracy of the formed body. The dimension and the quality of the formed body is controlled by heating with a burner or air cooling or water cooling of the surroundings of the molds corresponding with the nonuniformity of the cooling of the formed body, so that the temperature distribution of the formed body becomes uniform in cooling and solidifying the formed body in the mold after press forming. In this case, since arrangement of the molds is concentric, a sufficient space is required for the temperature measurement, the heating and the cooling, to accurately control the temperature of the molds on the center axis side of the index table. For that reason, the diameter of the index table has to be enlarged, which magnifies the facility, and which worsens the efficiency in view for the maintenance and the power thereof. Furthermore in the conventional press forming device, since the molds are fixed on the index table, the accurate adjustment of the relative position between a plunger of the press forming device and the molds is difficult, due to the thermal expansion of the index table. The enlargement of the index table is not desirable also in this respect. The adjustment of the position of the glass gob feeding, is performed by moving the whole body of the index table. Therefore a large scale facility for adjustment is required.

Furthermore, since the conventional press forming device has only one press forming device, the index time is restricted by the press forming time. Therefore, in switching the product kinds, the glass quantity per unit time necessary for press forming the formed body, has a variation, and the furnace operation becomes unstable.

In case of forming a panel for a CRT using a forming device which indexes simultaneously a plurality of molds, as mentioned above, when a pin welding operation for fixing the shadow mask on the formed body before it is removed from the mold, is required, although it is convenient that the glass temperature is elevated, since the welding time requires 10 seconds or more, the indexing stop time is extended, and the productivity is considerably lowered. For that reason, as shown in FIG. 4, the press forming step and the pin welding step have to be separated, which magnifies the facility and makes a production cost high.

In FIG. 4, a reference numeral 11 designates a glass gob feeding device, 12, a slow cooling furnace, 14, an index table, 15, a conveyor for panel transportation, and 16, a pin welding device.

Conventionally, the pins for fixing the shadow mask are welded to the inner surface of the panel after the press forming, by a burner heating or by an electromagnetic induction heating, which is a process separate with the press forming step, after a molten glass lump called glass gob is dropped on the mold, press-formed, cooled, and removed from the mold. However the pin welding is performed after the temperature of the panel after removed from the mold, is lowered. Therefore much time is required for the pin welding. Moreover, when the pin welding is performed, a new strain is introduced in the portion of the panel, and the shape of the panel at the welded portion of the pin is changed, which restricts the improvement of the quality.

SUMMARY OF THE INVENTION

It is an object of the present invention to provide an apparatus for forming a glass product and a method therefor capable of individually setting the transfer time and the stop time corresponding with the respective devices, of being applicable to the production of the multiple kinds of products, and of having a good productivity even in forming large glass products. It is an object of the present invention to provide a downsized apparatus for forming a glass product and a method therefor capable of dividing the transfer path into a plurality of sub-paths, improving the production efficiency of the pin welding for fixing a shadow mask to the formed body, and the quality of the welded portion, and improving dimensional accuracy and the quality of the formed product as well as the stability of the furnace operation.

According to an aspect of the present invention, there is provided an apparatus for forming a glass product which comprises: a single glass gob feeding device for feeding a glass gob to a mold for forming a formed body; a press forming device for press forming the glass gob into the formed body of a predetermined shape; a formed body removing device; a plurality of carrier means on which the mold is loaded; and a transfer means for transferring and circulating the carrier means on which the mold is loaded in an order of the glass gob feeding device, the press forming device, the formed body removing device, and back to the glass gob feeding device; wherein, assuming a path is defined as a path for transferring and circulating the carrier means by the transfer means, a single path or a plurality of paths is or are provided for the single glass gob feeding device.

According to another aspect of the present invention, there is provided a method for forming a glass product which comprises at least steps of: feeding a glass gob to a mold placed on a carrier means adjacent to directly under a glass gob feeding device: press forming the glass gob in a press forming device; and removing a press-formed body by a formed body removing device; wherein a single path or a plurality of paths is or are provided to the glass gob feeding device, for transferring and circulating the carrier means on which the mold is loaded, among the respective steps.

BRIEF DESCRIPTION OF THE PREFERRED EMBODIMENT

Figure 1:
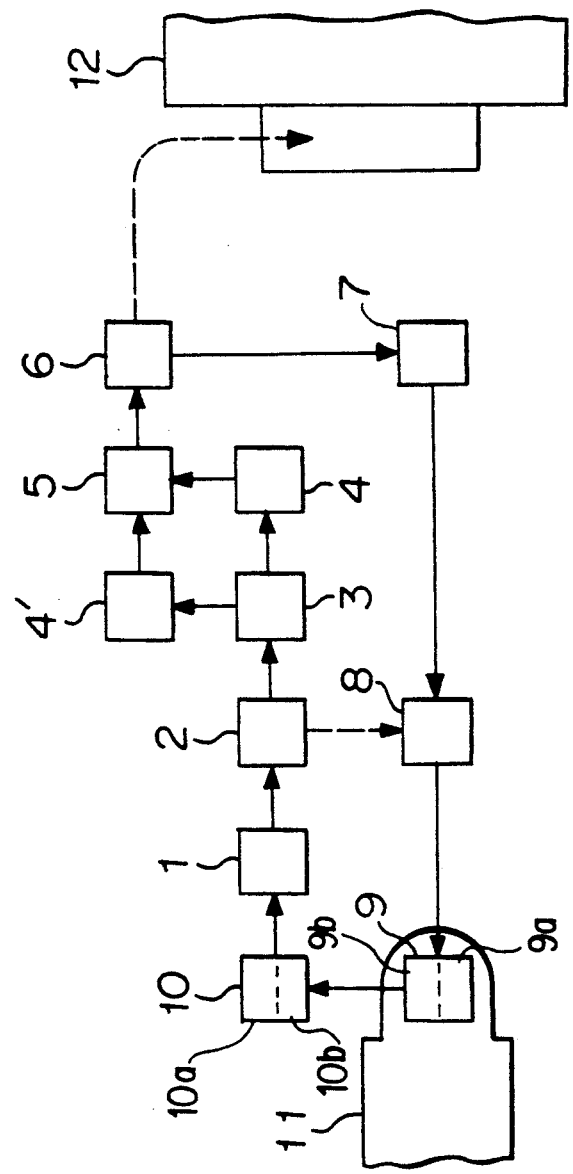
FIGS. 1 and 2 are block diagrams showing two embodiments of the apparatus according to the present invention.

In this present invention, as a glass gob feeding device, a publicly known device shown below, is utilized, in which a glass lump extruded from an office of an forehearth installed at the end of a glass melting furnace, is cut by a pair of cutters, dropped, and fed to a mold. As a press forming device, a publicly known device using a plunger can be utilized, and as a formed body removing device, a device can be utilized in which the formed body is lifted up and taken out by a publicly known means such as vacuum suction means. As a carrier means of the mold, a means such as a pallet which is secured on a truck moving on a transfer means such as rails or guides. The other similar transfer means using rails and guides can be utilized.

This forming device of the present invention, at least has a glass gob feeding device, a press forming device, and a formed body removing device. Furthermore, a carrier means loaded with a mold is transferred and circulated in an order of the glass gob feeding device, the press forming device, the formed body removing device, and back to the glass gob feeding device.

In the aforementioned first invention, a device can be made in which a plurality of molds which form a group is transferred by the group, and the press forming is carried out simultaneously for them. In this case, an apparatus (which is apparatus a) can be provided in which a single glass gob feeding device is utilized, glass gobs are successively fed to a group of a plurality of molds, the plurality of molds are transferred respectively by carrier means, and the glass gobs can simultaneously be press-formed by a plurality of press forming devices. In apparatus a, when the size of the group of the plurality of molds is small, the driving of the carrier means becomes easy and furthermore efficient, if the group of molds are transferred by a single carrier means. Furthermore, when a plurality of glass gob feeding device are provided in apparatus a, it becomes possible to feed glass gobs simultaneously to the group of the plurality of molds, which shortens the glass gob feeding time (this is defined as apparatus a1). In apparatus a1, when the size of the group of the plurality of molds is small, the driving of the carrier means becomes easy and furthermore efficient if the group of molds are transferred by a single carrier means. Furthermore, in apparatus a1, when different kinds of glass gobs are fed from a plurality of glass gob feeding devices, multiple kinds of glass products can simultaneously be produced by the press forming.

Furthermore, in order to promote the productivity, it is possible to make an apparatus in which a plurality of molds which form a group are transferred by the group in different paths, and press-formed respectively in the different paths. In that case, a device (which is apparatus b) can be provided in which a single glass gob feeding device is utilized, glass gobs are successively fed to a group of a plurality of molds, a plurality of molds are transferred respectively by the carrier means, and the glass gobs are simultaneously press-formed by a plurality of press forming device in a path. In apparatus b, when the size of the group of the plurality of molds is small, the driving of the carrier means becomes easy and furthermore efficient if the group is transferred by a single carrier means. Furthermore, when a plurality of glass gob feeding devices are provided in apparatus b, it becomes possible to feed the glass gobs simultaneously to a group of a plurality of molds, which shortens a glass gob feeding time (this is defined as apparatus b1). In apparatus b1, when the size of the group of the plurality of molds is small, the driving of the carrier means becomes easy and furthermore efficient if the single group is transferred by a single carrier means. Furthermore, in apparatus b1, when different kinds of glass gobs are fed from a plurality of glass gob feeding devices, multiple kinds of glass products can be produced simultaneously by the press forming.

An apparatus for forming a panel for a CRT (which is apparatus c) can be made, in which the glass product is a panel for a CRT, and which has at least a glass gob feeding device, a press forming device, a pin welding device for welding pins for fixing a shadow mask to the formed body, and in which the molds are transferred and circulated in an order of the glass gob feeding device, the press forming device, the pin welding device, and the formed body removing device. In this case, it is possible to weld the pins for fixing a shadow mask to the formed body before it is taken out from the mold. In apparatus c, a path is assumed to be a path in which the molds are transferred and circulated by the carrier means in an order of the press forming device, the pin welding device, the formed body removing device. It is possible to make an apparatus in which a plurality of paths are provided for a single glass gob feeding device, which promotes the productivity. Furthermore, the apparatus c can be an apparatus in which a plurality of pin welding devices are provided in a single path, and transfer path is divided into sub-paths in front of the plurality of pin welding devices. This apparatus is further effective in preventing the lowering of the productivity due to the pin welding device which is the rate controlling step, and in promoting the production efficiency. In this case, when a device which controls the rate of the apparatus, is a press forming device or the like, the same construction can be provided. As a pin welding device, it is possible to use a publicly known device in which the pins are heated by a burner heating or by an electromagnetic induction heating, and welded at predetermined positions on the inner surface of the panel.

In this invention, it is possible to provide an apparatus in which a glass gob drop distance adjusting means is provided which adjusts the distance between the glass gob feeding device and the mold, at adjacent to directly under the glass gob feeding device. By this means, it is possible to adjust the distance so that the defect generation due to the impact when the glass gob is dropped on the mold, is decreased, and the shape and the position of the glass gob in dropping which are different according to the kind of the glass gob, are adjusted by the distance. The glass gob drop distance adjusting means can move up and down a truck which is a transfer mean on rails or on guides and the pallet, by a publicly known mechanical means such as a hydraulic piston rod or a jack. The rail or the guide per se can be moved up and down by the mechanical mean such as the hydraulic piston rod or the jack. The other similar means can pertinently be applied.

Furthermore, in the present invention, the discrepancy between the center axes of a head of the press forming device and the mold, in press forming, can be adjusted, by attaching a head of the press forming device to the plunger main body, which is finely movable in a horizontal plane. Furthermore, to achieve the aforementioned purpose, it is possible to attach a bottom of the molds to the carrier means which is finely adjustable in a horizontal plane. Furthermore, it is possible to provide both the head of the press forming device and the bottom of the mold which are finely adjustable in horizontal planes. In this case, concerning the attaching and the attached portions, the upper portion of the head is shaped in T-shape or umbrella-shape, and a space is provided which is similar to the T-shape or the umbrella-shape, at the lower part of the plunger main body and the volume of which is larger than the corresponding upper portion of the head, and in which the top portion of the head is inserted. In such space, the top portion of the head can be a mechanism finely adjustable in a horizontal plane, that is, a floating mechanism. As the floating mechanism, a mechanism can be used in which the top portion of the head is floated by air gushed from a plurality of small holes provided at the lower portion of the space. Furthermore, the floating mechanism can be a mechanism which can finely move in a horizontal plane by a coil spring or a ball bearing or the like.

In case of the mold, similarly, a mechanism finely adjustable in a horizontal plane, can be provided. In case of the mold, in the mechanism, a pallet or the like which is loaded with the mold can move in two orthogonal directions in a horizontal plane, by a plurality of push rods driven by motors or hydraulic cylinders or the like. It is possible to put a pallet or the like which is loaded with the mold, on two plates which respectively slide in two orthogonal directions in a horizontal plane. The other publicly known mechanisms can be used.

It is possible to feed a glass gob in a moving mold, without stopping the mold loaded on the carrier mean, for the glass gob feeding, at adjacent to directly under the glass gob feeding device, which promotes the productivity. In case of a funnel for a CRT or the like which has many curved surfaces, and is difficult to form, or a large sized glass product or the like, it is possible to press-form them by using a plurality of press forming devices in which a single glass gob is press-formed for plural times, by which the press forming is performed improving the accuracy of the curved surface or the thickness thereof. Furthermore, with recent enlargement of a TV set, the panel and the funnel for a CRT are enlarged. Therefore it becomes necessary to press-form a large sized glass gob. It is possible to feed a plurality of glass gobs in a single mold. In that case, it is possible to produce a glass product such as a high strength panel or a browning preventive panel by press forming a laminated plural layer panel having different glass matrices of the glass gobs.

The glass products of the present invention, are a panel and a panel for a CRT, a dish, a cup, a bin, a lens, and the like which are produced by the press forming.

EXAMPLES

EXAMPLE 1

In a forming apparatus of a panel for a CRT proposed by the present invention, a block diagram of transfer path of the formed body and the mold in the forming apparatus, is shown in FIG. 1. The bottom molds are respectively loaded on the pallets of the carrier means, and the pallets are individually and linearly transferred along a loop shown by the bold line among the respective devices 1 through 10 in FIG. 1. In FIG. 1, a reference numeral 1 designates a cooling device of the formed body and the mold, 2, a shell mold removing device, 3, another cooling device of the formed body and the mold, 4 and 4', pin welding devices to the formed body, 5, a separating device of the formed body out of the bottom mold, 6, a removing device of the formed body out of the bottom mold, 7, a waiting position of the bottom mold, 8, a shell mold attaching device to the bottom mold, 9, a glass gob feeding device to the mold, and 10, a press forming device of the glass gob.

The production of the formed body is carried out by the following process.

A molten glass lump, that is, the glass gob is fed to the bottom mold at a glass gob feeding device 9. The glass gob is press-formed by the press forming device 10. The material is cooled by the cooling device 1. The shell mold is removed by the shell mold removing device 2. The material is further cooled by the cooling device 3. Pins are welded to the material by the pin welding devices 4 or 4'. The material is separated from the bottom mold by the separating device 5. The material is removed out of the mold by the formed body removing device 6, and out of the cycle of the forming system. The material is transferred to the slow cooling furnace 12 for stress removing. The shell mold is attached to the bottom mold by the shell mold attaching device 8. The shell mold is transferred in the order of the glass gob feeding device 9, the press forming device 10, and the cooling device 1. Just after the shell mold is removed from the bottom mold by the shell mold removing device 2, it is transferred to the shell mold attaching device 8, where it is attached to the other bottom mold.

In the pin welding step, it requires much time compared with the other steps, and this step becomes a rate controlling step. Therefore, at the cooling device 3, the transfer path is divided into sub-paths. Two pin welding devices 4 and 4' are installed where the pin welding is performed alternatively. After that the pallet, the transfer means is transferred to the separating device 5. In forming the enlarged size products, the cycle time of the forming system is restricted more by the pressing time than the pin welding time. In this case the pin welding device may be single, and it is not necessary to divide the transfer path. Furthermore depending on the kind of the formed body, the time required for the other processes is sufficiently short compared with the pin welding time. In this case the number of the pin welding device may be 3 or more, and the transfer paths in front of and after the pin welding device may be divided into a plural number of 3 or more. Furthermore, the pin welding devices 4 and 4' may be dispensed with, and the forming of the panel can be performed by the transfer time and the stop time which correspond with the respective devices. Therefore it is possible to produce good quality products efficiently.

In this embodiment, the pallet, the transfer means is loaded and fixed on a truck, and is moved on rails or guides of the transfer means.

In this embodiment, the pallet moves at the speed of about 1 m/sec, and passes through the whole of the steps in 1.5 to 2 minutes. This time is 40 to 50% of that of the whole of the steps of the conventional index table type forming apparatus including the pin welding step. Furthermore, the floor area and the space occupied by the apparatus is 50% of less as small as those in the conventional index table apparatus including the pin welding device. The shape of the pin welding portion of the panel is made beautiful and the yield thereof is improved. In the cooling step of the panel, since the whole of the formed body is uniformly cooled, the dimensional accuracy of the products, and also the general yield are improved.

EXAMPLE 2

Figure 2:
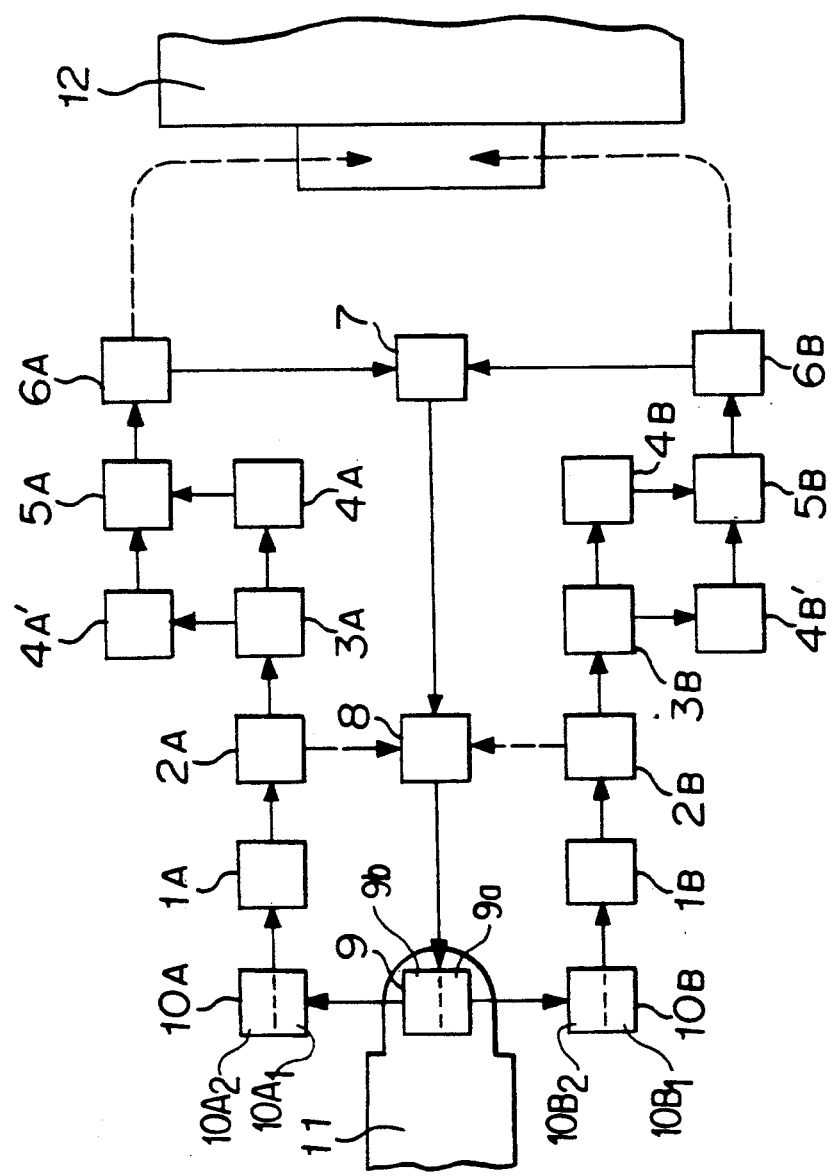
Figure 3:
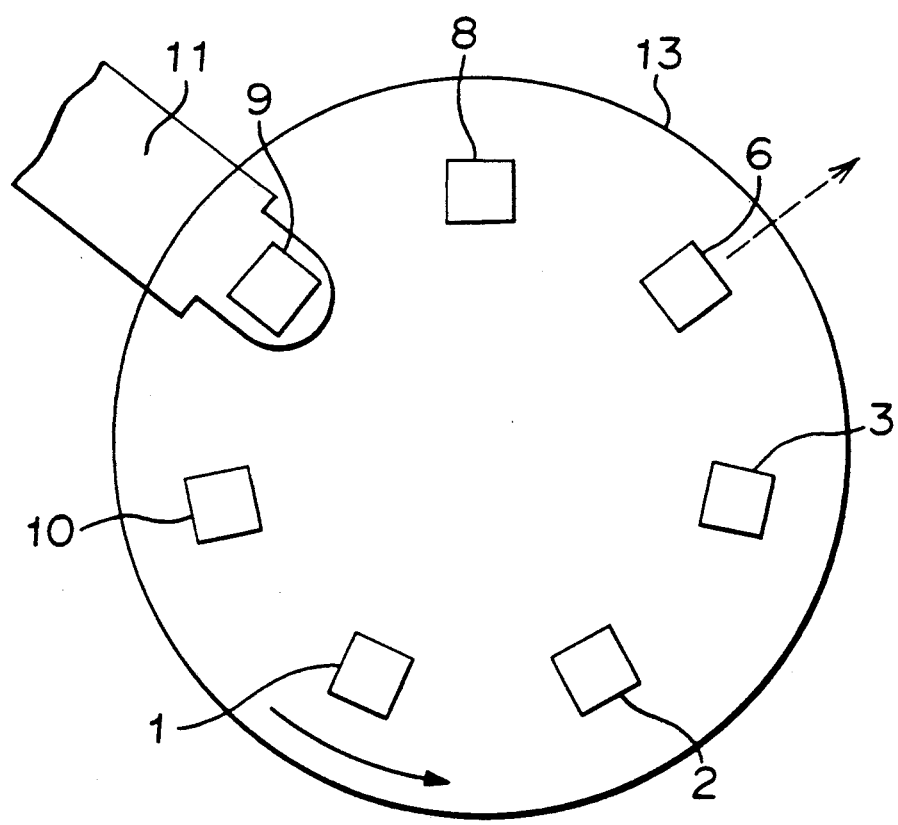
FIGS. 3 and 4 are block diagrams showing a conventional example.
Figure 4:
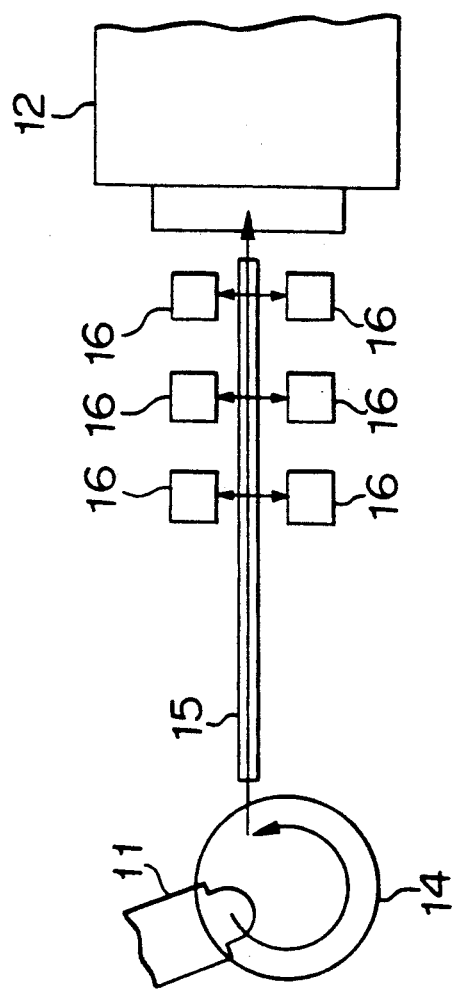

A block diagram of another preferred transfer path of the formed body and the mold is shown in FIG. 2. In this apparatus, the transfer path of the pallet, the transfer means is divided in two routes for a single glass gob feeding device 9, that is, A-line and B-line. Two press forming device 10A and 10B are provided. By this construction is becomes possible to shorten the cycle time for the forming apparatus, as well as to decrease the number of the product switching and to perform an efficient operation of the switching, and provide an easy measure for multi-kind small lot production. The molds and the formed bodies are individually transferred by the respective pallets. The transfer path is generally the same with the forming apparatus shown in FIG. 1, both in A-line and B-line. In this apparatus, the lines A and B join at the bottom mold waiting position 7. The pallets mix at the bottom mold waiting position 7, the shell mold attaching device 8, and the glass gob feeding device 9.

In this embodiment, the pallets, the transfer means are loaded and fixed on a truck, and it is moved on rails or guides of the transfer means.

Also in this embodiment, the time required for the whole steps is shortened by 40 to 50% of one cycle of the conventional index table type apparatus including the pin welding step. An effect is recognized in this Example which is almost the same with that in Example 1.

EXAMPLE 3

Figure 8:
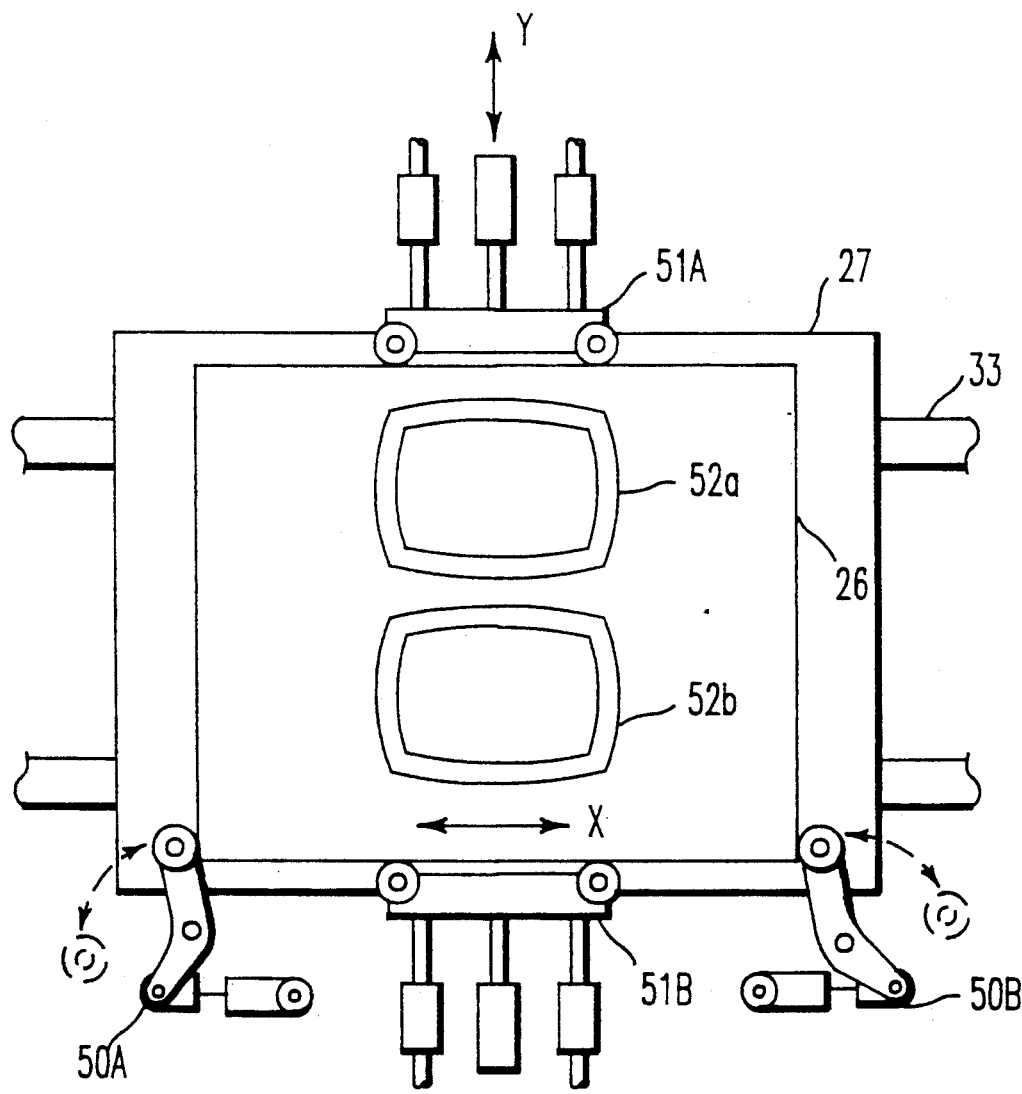
FIG. 8 depicts a mold carrier arrangement as shown in FIG. 7, however, with the pallet adapted to carry a plurality of molds.

In this Example, the similar apparatus with that in Example 1 is utilized. Two molds compose one group. The two molds are loaded on the respective pallets or could be provided in a single pallet as representatively depicted at 52a, 52b of FIG. 8. The glass gob is successively fed to the two molds of one group. The two molds are transferred by the group. The press forming is performed simultaneously by the two press forming devices 10 (indicated schematically with the broken line delimiting the two press forming devices 10a, 10b). In this case, although the waiting time in front of the pin welding device which is the most time consuming step, is longer than that in Example 1, the general productivity is promoted more than that in Example 1.

EXAMPLE 4

In this embodiment an apparatus which is similar to that in Example 3, is utilized. Two glass gob feeding devices 9 are installed at the position 9 in FIG. 1 as indicated schematically with the broken line demarcating two glass gob feeding devices 9a, 9b. The glass gob is fed simultaneously to the two molds which compose one group. These molds are transferred by two pallets. The press forming is simultaneously performed by two press forming devices 10. In this Example, although the waiting time in front of the pin welding device which is the most time consuming step, is longer than that in Example 1, the general productivity is promoted compared with that in Example 3.

EXAMPLE 5

In this Example an apparatus which is similar to that in Example 2, is utilized. Two molds compose one group. The two molds are loaded on the respective pallets. The glass gob is successively fed to the two molds of the single group. The molds are transferred by the group. The press-forming is simultaneously performed by two press forming devices 10. In this Example, although the waiting time in front of the pin welding device which is the most consuming step, is longer than that in Example 2, the general productivity is promoted compared with that in Example 2.

EXAMPLE 6

In this Example an apparatus which is similar to Example 5, is utilized. Two glass gob feeding devices are provided (e.g. 9a, 9b in FIG. 2). The glass gob is fed simultaneously to the two molds of the single group. The molds are loaded on the respective pallets. The molds are transferred by the group. Two sets of the press forming devices 10A and 10B, in which one set is composed of two press forming devices (as represented schematically at $10A_1$, $10A_2$ and $10B_1$, $10B_2$), simultaneously press form two glass gobs in one line. In this Example, although the waiting time in front of the pin welding device which is the most time consuming step, is longer than that in Example 2, the general productivity is promoted compared with that in Example 5.

EXAMPLE 7

Figure 5:
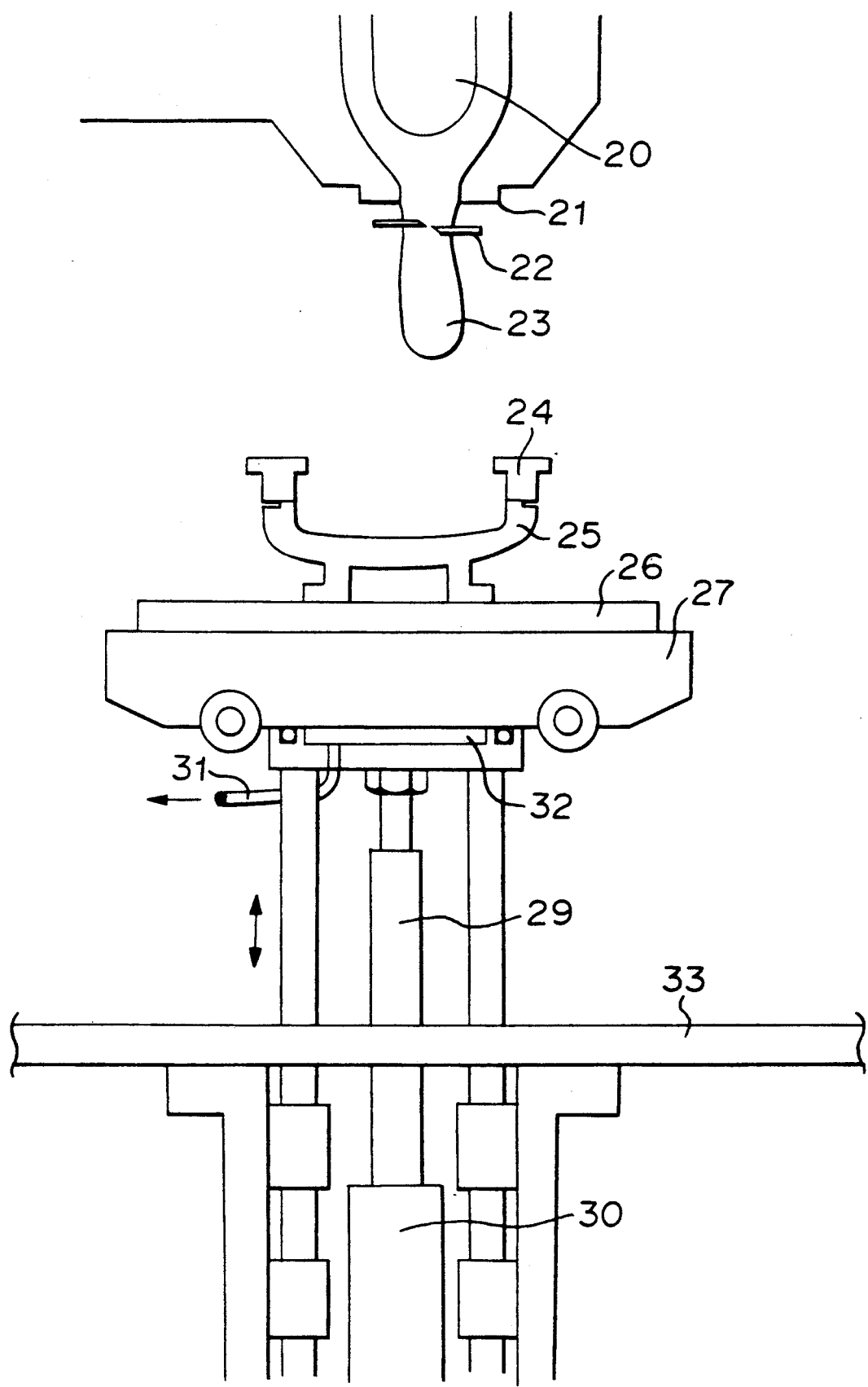
FIG. 5 is a side view of a glass gob drop distance adjusting means according to the present invention.

In an apparatus which is similar to Examples 1 and 2, a glass gob drop distance adjusting means is provided which adjusts the distance between the glass gob feeding device 9 and the mold which is at adjacent to directly under the glass gob feeding device 9. The construction is shown in FIG. 5. The molten glass is extruded by the needle 20 from the orifice 21. The glass gob is cut by the shear blade 22, so that it becomes the glass gob 23 of a predetermined weight. The glass gob 23 drops in the mold consisting of the bottom mold 25 and the shell mold 24. At this occasion the height of the mold and also of the pallet 26 and the truck 27, is adjusted by the glass gob drop distance adjusting means. The glass gob drop distance adjusting means is equipped with the hydraulic cylinder 30, the piston rod 29 which vertically moves by the hydraulic cylinder 30, and a vacuum suction device which is installed on top of the piston rod 29. When the truck 27 comes adjacent to directly under the orifice 21, the vacuum suction device installed on top of the piston rod 29, is elevated from between the two rails 33, and secures the bottom surface of the truck 27 by the vacuum suction. A reference numeral 31 designates a pipe for sucking air, and 32, a space for the vacuum suction. The piston rod 29 is further elevated and the glass gob 23 can drop in the mold from an optimum height.

As a result, it becomes possible to choose the optimum drop distance corresponding to the size of the glass gob, and the position and the shape of the glass gob in the mold, are stabilized. Therefore, in press forming, the glass gob is uniformly extended to the inside periphery of the mold. Therefore, since unformed portion of the formed body is difficult to be made, inferior products generation ratio becomes small and the productivity is promoted.

EXAMPLE 8

Figure 6:
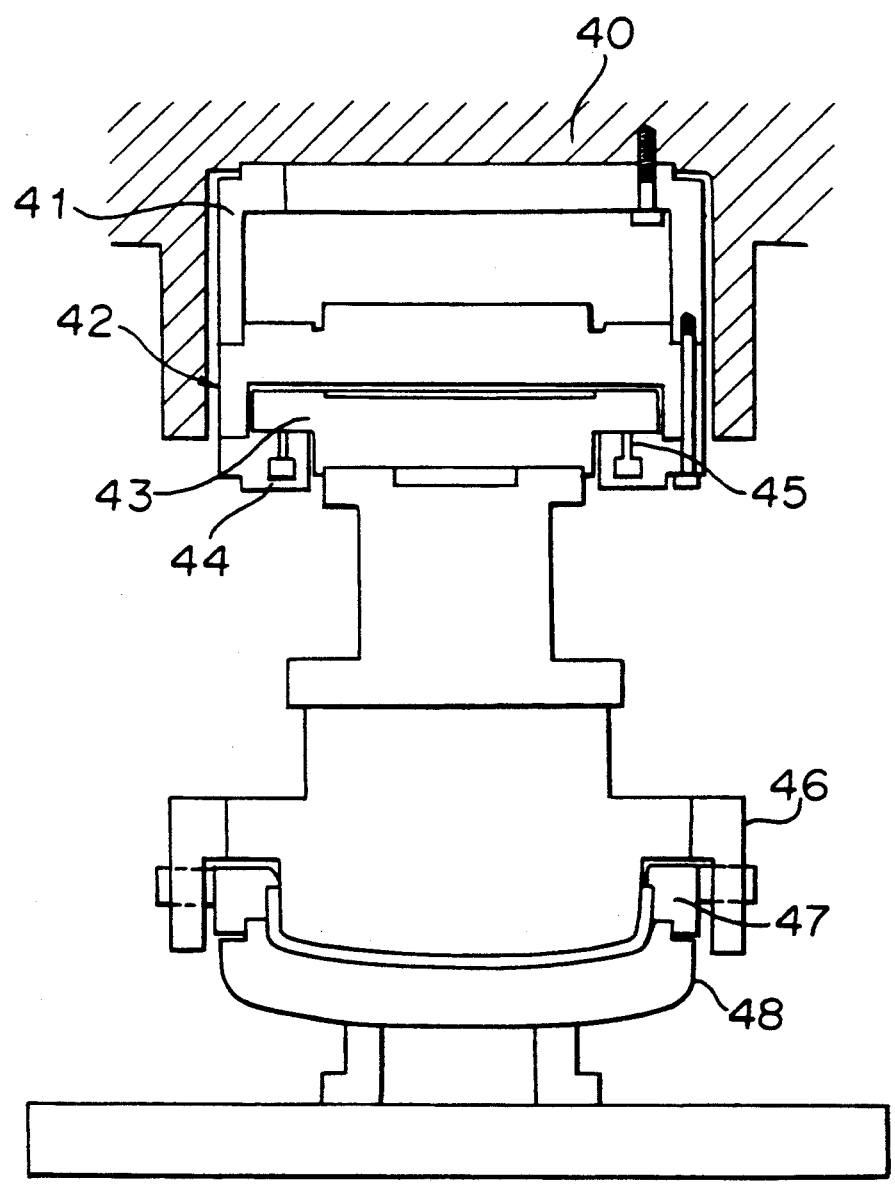
FIG. 6 is a sectional side view of a press forming device which is provided with a floating mechanism according to the present invention.

In this Example a floating mechanism is attached to an apparatus which is similar to Examples 1 and 2, so that a head of the press forming device is finely adjustable in a horizontal plane on the plunger main body. The top portion of the head has a planar umbrella-shape, and the top portion of the head is inserted into the plunger main body which has a space at its lower portion, the shape of which is similar to that of the top portion of the head, and which has the volume slightly larger than the top portion of the head. The top portion of the head is floated by air from a plurality of small holes at the lower portion of the space, and is a mechanism finely adjustable in a horizontal plane. The construction is shown in FIG. 6. At the lower portion of the plunger main body 40, the ring 41, the upper flange 42, and the lower flange 44 are attached. To the lower flange 44, a plurality of nozzles 45 are provided which float the floating head 43 by blowing compressed air toward the lower surface of the floating head 43. A reference numeral 46 designates a key which is provided at the periphery portion of the plunger head, which engages with the shell mold 47, and aligns the center axis. A numeral 48 designates a bottom mold.

The floating head 43, is floated by about 30 $\mu$m by the air gushed from the nozzles 45 of the lower flange 44, and is movable in the horizontal direction by an extremely light force. Accordingly the floating head 43 does not move in a horizontal plane, in forming, when the central axes of the head and the mold are aligned. However, when the central axes of the head and mold are deviated due to the influence of thermal expansion or the like, the floating head 43 finely moves in a horizontal plane in a direction in which the central axes are aligned, in forming. Therefore, the defect with respect to the inaccuracies of the curved surface and the thickness of the panel due to the discrepancy of the central axes, is almost eliminated.

EXAMPLE 9

Figure 7:
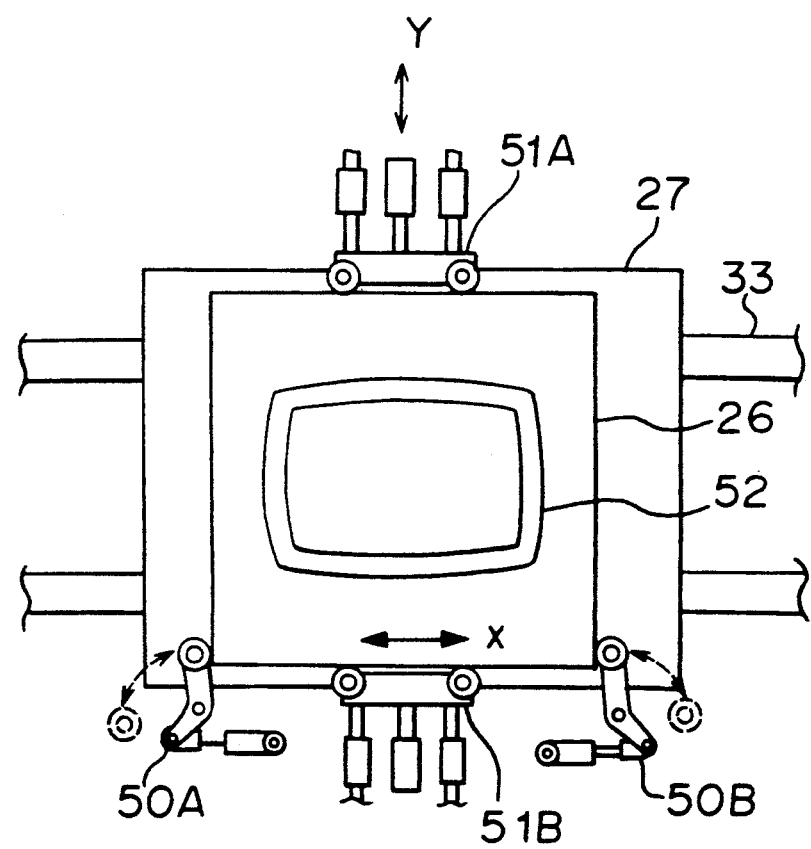
FIG. 7 is a plan showing a positioning device for mold according to the present invention.

In this example a mechanism is attached to an apparatus which is similar to Examples 1 and 2, so that the mold is finely adjustable in a horizontal plane on the pallet. The construction is shown in FIG. 7. In FIG. 7, a reference numeral 33 designates a rail, 27, a truck, 26, a pallet, and 52, a mold. Notations 50A and 50B designate a positioning device which finely adjusts the pallet in X-direction on the horizontal plane. Parts 51A and 51B, is another positioning device which finely adjust the pallet in Y-direction in the horizontal plane, which is orthogonal to the X-direction. The positioning devices 50A and 50B are composed of motors and push arms driven by the motors. Rollers are provided at the contact portions of the push arms and the pallets, and the push arms per se are composed rotatable around axes. The other ends of the push arms are engaged with rods which are moved linearly by the motors. The positioning devices 51A and 51B are composed of motors and push rods which are linearly driven by the motors. At the contact portions of the push rods and pallets rollers are provided, and the other ends of the push rods are composed of ball screws linearly moved by the motors.

By this mechanism, the press forming is performed with center axes of the plunger and the head being aligned in spite of the influence of the thermal expansion or the like. Furthermore, in adjusting the optimum position of the glass gob dropping in the mold, conventionally, the whole body of the index table is moved in a horizontal plane. However in this mechanism, the adjustment is made by moving only the mold. Therefore the down-sizing of the apparatus becomes possible. The mechanism may be of a construction in which the mold is loaded on two laminated planes, and the respective planes are adjustable as for their positions in two orthogonal directions in a horizontal plane.

What is claimed is:

1. An apparatus for forming a glass product which comprises:
    a glass gob feeding device for feeding and depositing glass gobs into molds for forming a formed body;
    a press forming device for press forming the glass gob into the formed body of a predetermined shape;
    a formed body removing device;
    a plurality of carrier means on which molds are loaded, each of said plurality of carrier means including at least one mold loaded thereon; and
    a transfer means for transferring and circulating the carrier means on which the molds are loaded in an order of the glass gob feeding device, the press forming device, the formed body removing device, and back to the glass gob feeding device;
    said transfer means forming at least one path along which the carrier means travel, said path including at least one divergence at which the path divides into at least two sub-paths such that only a portion of the plurality of carrier means travels along one of the at least two sub-paths, said path further including at least one convergence at which the sub-paths meet.

2. The apparatus for forming glass products according to claim 1, wherein each said carrier means includes a plurality of the molds loaded thereon which compose a group of molds, wherein a plurality of said press forming devices are provided for simultaneously press forming the glass gobs fed to the group of molds.

3. The apparatus for forming glass products according to claim 2, wherein a plurality of said glass gob feeding devices feed the glass gobs to the group of molds.

4. The apparatus for forming glass products according to claim 3, wherein the plurality of glass gob feeding devices respectively feed the glass gobs of respectively different kinds.

5. The apparatus for forming a glass product according to claim 1, wherein the path is divided into said sub-paths in front of a device which controls a production rate of the apparatus.

6. The apparatus for forming a glass product according to claim 1, wherein at least one carrier means of said plurality of carrier means includes a plurality of the molds loaded thereon.

7. The apparatus for forming a glass product according to claim 6, wherein a single carrier means is loaded with the group of the plurality of molds.

8. The apparatus for forming a glass product according to claim 1, wherein the glass product is a panel for a CRT.

9. The apparatus for forming a glass product according to claim 8, further comprising:
a pin welding device for welding a plurality of pins for fixing a shadow mask on the formed body provided between the press forming device and the formed body removing device.

10. The apparatus for forming a glass product according to claim 1, wherein the glass product is a funnel for a CRT.

11. The apparatus of forming a glass product according to claim 1, further comprising:
a glass gob drop distance adjusting means for adjusting a distance between the glass gob feeding device and the mold.

12. The apparatus of forming a glass product according to claim 1, wherein the press forming device comprises a plunger head attached to a plunger main body, said press forming device including adjustment means for adjusting a position of said plunger head in a horizontal plane so that a discrepancy of center lines of the head and the mold can be adjusted in press forming the glass gob.

13. The apparatus of forming a glass product according to claim 1, further comprising:
adjustment means for adjusting a position of said at least one mold in a horizontal plane so that a discrepancy of center lines of the press forming device and the mold can be adjusted in press forming the glass gob.

14. The apparatus of claim 1, wherein each of said at least two sub-paths includes a pin welding device.

15. The apparatus of claim 14, wherein a cooling means is provided upstream of said divergence such that each of the formed bodies carried by said carrier means is cooled by said cooling means and thereafter said path divides into said at least two sub-paths.

16. The apparatus of claim 15, wherein said formed body removing device is downstream from the convergence such that each of the plurality of carrier means pass through a common removing means.

17. The apparatus of claim 1 wherein said at least one path comprises two paths.

18. The apparatus of claim 17, wherein said paths converge at a common waiting station.

19. The apparatus of claim 18, wherein said waiting station is downstream of the formed body removing device provided along each of the paths.

20. A method for forming a glass product which comprises at least steps of:
feeding a glass gob to a mold placed on a carrier means of a plurality of carrier means, said feeding occurring as a carrier means is adjacent to and directly under a glass gob feeding device;
press forming the glass gob in a press forming device; and
removing a press-formed body by a formed body removing device;
said method further including the step of transferring the plurality of carriers along a path in which said feeding, press forming and removing devices are disposed along said path, said path including at least one divergence at which the path divides into at least two sub-paths such that only a portion of the plurality of carrier means travels along one of the at least two sub-paths, said path further including a convergence at which the sub-paths meet.

21. The method of forming a glass product according to claim 19, wherein a plurality of molds which compose a group, are placed on at least one carrier means of the plurality of carrier means, and a plurality of glass gobs charged in the group of molds are simultaneously press-formed.

22. The method of forming a glass product according to claim 20, wherein the path is divided into the at least two sub-paths in front of a step which controls a production rate of the method.

23. The method of claim 20, wherein the transferring step includes transferring a second plurality of carrier means along an additional path along which additional press forming and removing devices are disposed, wherein said feeding device feeds glass gobs to both said first mentioned path and said additional path.

* * * * *